July 28, 1925.  
E. WILSON  
1,547,987  
PRESSURE CONTROLLED ENGINE REGULATOR  
Filed Nov. 10 1924  3 Sheets-Sheet 1
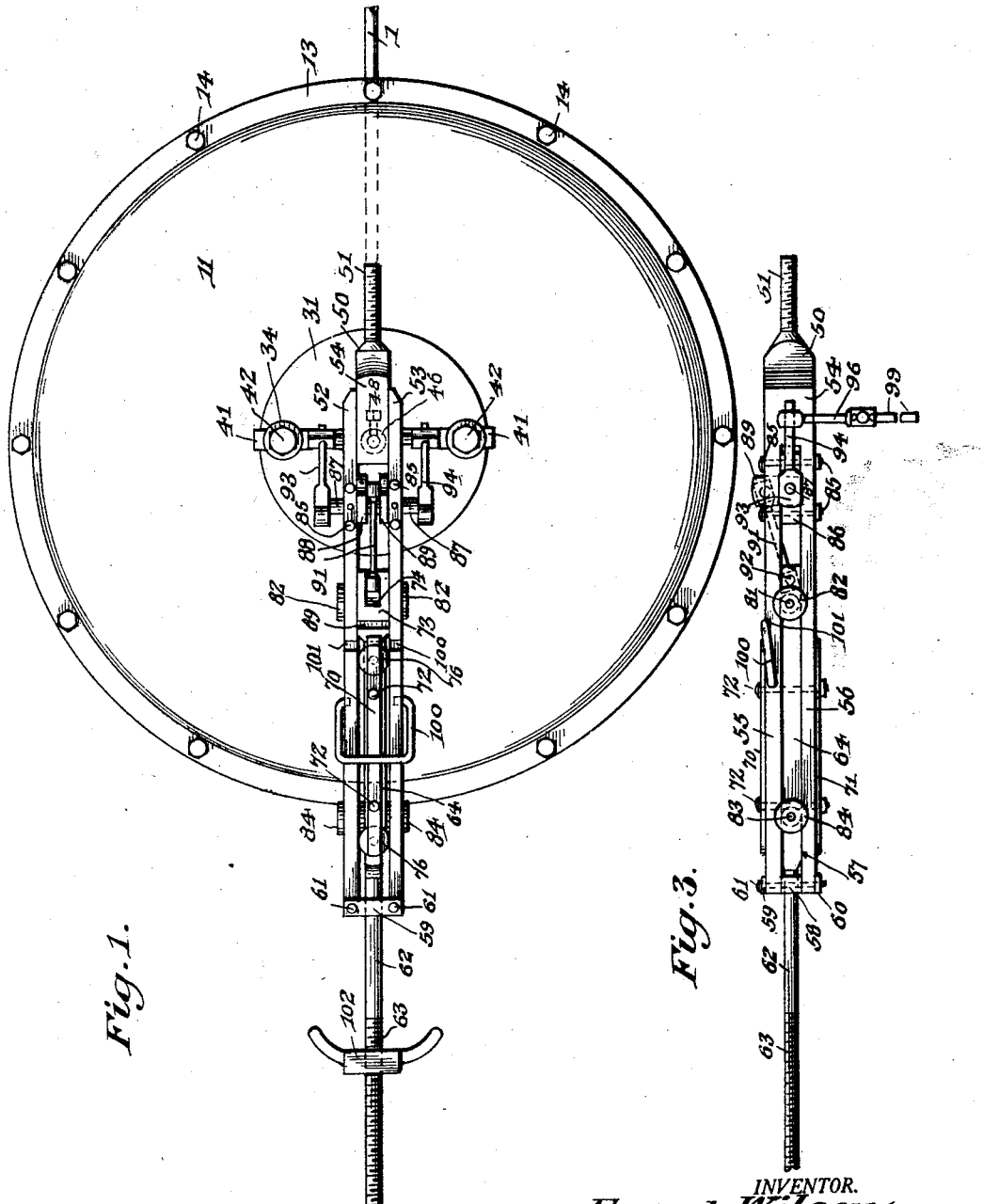
INVENTOR.  
*Ernest Wilson,*  
BY  
*Geo. F. Kimmel*  ATTORNEY.

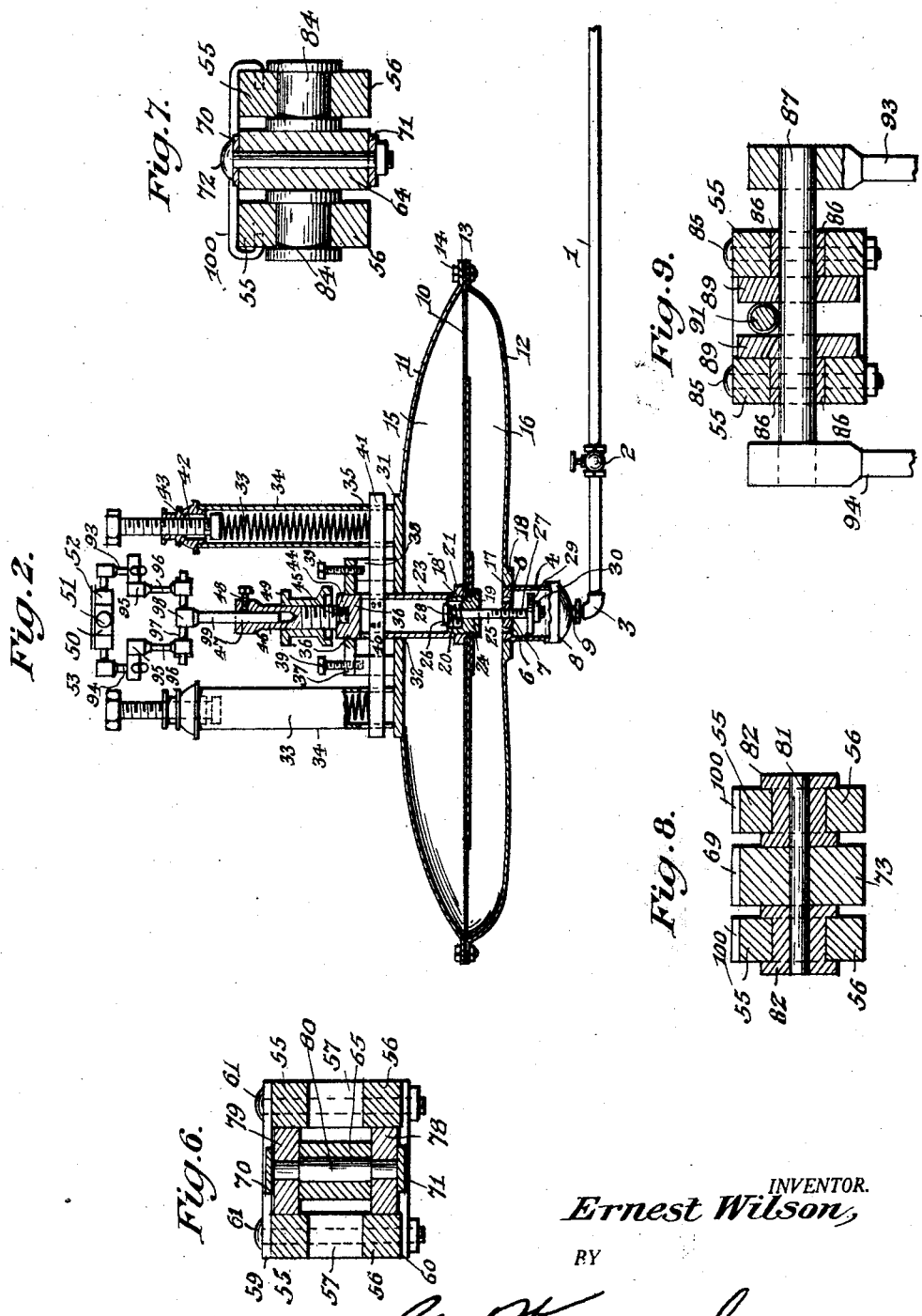

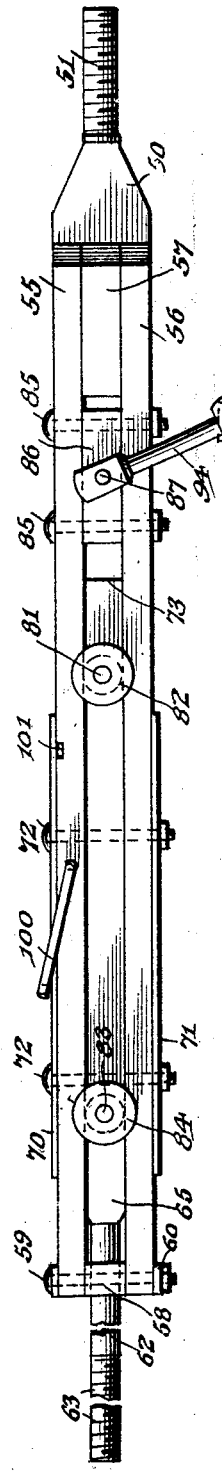

Patented July 28, 1925.

1,547,987

UNITED STATES PATENT OFFICE.

ERNEST WILSON, OF GRANTSVILLE, WEST VIRGINIA.

PRESSURE-CONTROLLED ENGINE REGULATOR.

Application filed November 10, 1924. Serial No. 749,010.

*To all whom it may concern:*

Be it known that I, ERNEST WILSON, a citizen of the United States, residing at Grantsville, in the county of Calhoun and State of West Virginia, have invented certain new and useful Improvements in Pressure-Controlled Engine Regulators, of which the following is a specification.

This invention relates to a pressure controlled engine regulator designed primarily for use in connection with steam and gas engines employed for operating pumps in natural gas fields, but it is to be understood that a regulator, in accordance with this invention, can be used in connection with any type of engine for which it is found applicable, and the invention has for its object to provide, in a manner as hereinafter set forth, an engine regulator having means controlled and operated by suction pressure in the pump line for regulating the speed of the engine to hold the suction pressure at the desired degree or poundage on the suction line at the pump, driven from the engine, to insure satisfactory pumping, irrespective of the decrease or increase of pressure on the suction line.

Further objects of the invention are to provide, a pressure controlled engine regulator, in a manner as hereinafter set forth, which is comparatively simple in its construction and arrangement, strong, durable, automatic in action, thoroughly efficient in its use, readily installed, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of a pressure controlled engine regulator, in accordance with this invention.

Figure 2 is a sectional elevation thereof.

Figure 3 is a side elevation of the governer rod and mixing or intake valve regulating mechanism in an inoperative position.

Figure 4 is a like view of said mechanism in an operative position.

Figure 5 is a sectional elevation of said mechanism in an operative position.

Figure 6 is a section on line 6—6, Figure 5.

Figure 7 is a section on line 7—7, Figure 5.

Figure 8 is a section on line 8—8, Figure 5.

Figure 9 is a section on line 9—9, Figure 5.

Referring to the drawings in detail, 1 denotes a low pressure line, which is connected to a main suction line, not shown, in proximity to a pump not shown, and said low pressure line 1 is provided with a valve 2 and also with an elbow 3 at one end. Connected with, as well as opening into the elbow 3, is a primary pressure intake casing 4, having its upper end closed by a head piece 5, formed with ports 6, and a centrally arranged opening 7. The lower end 8 of the casing 4 is formed with an inlet nipple 9 secured to the elbow 3.

Arranged over, as well as being connected to the top of the casing 4, is a sectional casing for inclosing a flexible diaphragm 10. The casing which incloses the diaphragm 10 comprises an upper section 11 and a lower section 12. The sections 11 and 12 are formed with laterally extending opposed flanges 13 secured together by hold-fast devices 14. The marginal portion of the diaphragm 10 extends between the opposed flanges 13 and is fixedly secured to said flanges by the hold-fast devices 14. The sectional casing provides a diaphragm chamber, and the latter through the medium of the diaphragm 10 is formed into an upper compartment 15 and a lower compartment 16. The section 11 is of convex contour and the section 12 concave.

The section 12, at its center, is provided with an opening 17, and that portion of the section 12 surrounding the opening is thickened, as at 18, and fixedly secured in any suitable manner to the upper end of the casing 4. Preferably the casing 4 threadedly engages with the thickened portion 18 of the section 12. Communication is established between the compartment 16 and the casing 4 through the medium of the ports 6 formed in the head piece 5, the latter being in the form of an apertured disk.

Extending through the diaphragm 10, at the center thereof, as well as being fixedly secured therewith, is a combined coupling and guide member 18 formed at its lower end with a lateral flange 19, which abuts against the lower face of the diaphragm 10, as well as providing a seat for the latter. The member 18 extends a substantial distance above the diaphragm 10, and has its upper portion formed with a pocket 20. The periphery of the member 18 is threaded, and mounted on the diaphragm 10 and surrounding the member 18 is a packing washer 21, which is engaged by a vertically disposed sleeve 23, threadedly engaging with the member 18.

Centrally of the member 18, a vertical opening 24 is formed which communicates with the pocket 20. Extending down through the opening 24, across the compartment 16, through the opening 7 and into the chamber 4 is a valve stem 25, having its upper end formed with a head 26 and its lower portion peripherally threaded, as at 27. Mounted in the pocket 20 and surrounding the stem 25, as well as interposed between the head 26 and the bottom of the pocket 20, is a coiled cushioning spring 28 for the stem 25. Adjustably mounted on the lower end of the stem 25, within the chamber 4, is a valve disk 29, secured in adjusted position by a locking nut 30. The valve disk 29 when seated closes the ports 6, and when the disk 29 is unseated, pressure will pass around the disk and through the ports 6 into the compartment 16 and act against the diaphragm 10, thereby elevating the same.

The section 11 of the diaphragm casing has the central portion thereof thickened, as indicated at 31, and the said portion 31 is provided with an opening 32 for the passage of the sleeve 23, which is vertically shifted through the medium of the diaphragm 10 and against the action of a pair of controlling springs 33 carried in a pair of vertically disposed casings 34, formed integral with the thickened portion 31 and each having near its lower end a pair of opposed slots 35.

The sleeve 23 projects a substantial distance above the section 11 and has connected to its upper end a head piece 36 extended through an opening 36′ formed in a plate 37, and said plate terminates in two pairs of spaced apertured guides 38, formed integral with the thickened portion 31 of the section 11 of the diaphragm casing, and each pair of guides 38 is interposed between the sleeve 23 and a casing 34. The plate 37 is provided with a pair of vertically adjustable stop screws 39 and each has its lower end positioned between a pair of guides 38, and said stop screws 39 provide means for adjustably controlling the upward movement of the sleeve.

The upper portion of the sleeve 23 is formed with a pair of opposed slots 40, and secured to the upper end of the sleeve 23, as well as extending through the opposed slots 40 and also through the opposed slots 35 of each casing 34, is a bar 41, against which bears the springs 33 and which is also adapted to abut against the screws 39. The bar 41, in connection with the springs 33 and stop screws 30, provides means for controlling the upward movement of the sleeve 23 when the latter is shifted by the diaphragm 10 and such movement, however, it had against the action of the springs 33. Tensioning elements for the springs 33 are indicated at 42, and which threadedly engage in the upper ends 43 of the casings 34.

The head piece 36 has its top formed centrally with a socket 44, having a threaded wall, and threadedly engaging with the wall of the socket 44 is a threaded protuberance 45, formed on the lower end of a vertical stem 46, which has the lower portion of its periphery threaded. The upper portion of the stem 46 is formed with a vertically disposed socket 47, and carried by the stem and disposed at right angles to the socket 47 is a set screw 48 for a purpose to be presently referred to.

Threadedly engaging with the stem 46 is a stop member 49 for controlling the lowering movement of the sleeve 23, as said member 49 is arranged to abut against the plate 36 to arrest downward movement of the sleeve 23. The member 49 is adjustably mounted on the stem 46 and any suitable means can be employed for fixedly maintaining the member 49 in its adjusted position.

The mechanism for regulating the governer rod and intake or mixing valve of the engine is adjustably connected to the stem 46, and said mechanism includes a head 50, formed with a forwardly projecting cylindrical peripherally threaded extension 51 for connection with the intake or mixing valve of the engine. The head 50 is secured between the forward end terminal portions of a pair of spaced combined guide and supporting members 52, 53. The head 50 and members 52 and 53 are fixedly secured together. As the member 52 is constructed the same as member 53, but one will be described, as the description of one will apply to the other. Each of said members consists of a solid rectangular forward portion 54, having extending rearwardly therefrom a pair of elongated spaced arms 55, 56, thereby providing an elongated slot 57, which extends from the portion 14 to the rear ends of the arms 55, 56. Positioned between the rear ends of the arms 55, 56, is a small block 58 which closes the rear end of the slot 57.

Mounted on the members 52, 53, at the rear ends thereof and positioned against the bottom of the members 52, 53, at the rear ends thereof, is a coupling strip. The upper coupling strip is indicated at 59 and the lower at 60. The blocks 58 and the strips 59 and 60 are secured to the members 52, 53, through the medium of the hold-fast devices 61. The blocks 58 are of the same width as the width of the arms 55, 56, and are flush therewith, and the height of the blocks 58 is the same as the height of the slots 57.

Extending between the members 52 and 53 is a governor rod controlling bar 62, which is peripherally threaded, as at 63, and said bar may be the governor rod, or coupled to the governor rod in any suitable manner. The bar 62 terminates at its forward end in a slide 64, having a reduced rear terminal portion 65, thereby providing a pair of shoulders 66. The slide 64, intermediate its ends, at the top and bottom thereof, is grooved, as at 67, 68, and forwardly of the groove 67 the slide 64 is transversely grooved, as at 69, and which is of less width than the transverse grooves 67, 68.

Positioned against the upper face of the slide 64, centrally thereof, is a lengthwise extending retaining member 70, which projects rearwardly of the upper shoulder 66 and forwardly across the groove 67 and terminates rearwardly of the groove 69. Positioned against the lower face of the slide 64, centrally thereof, is a longitudinally extending retaining member 71, which projects rearwardly from the lower shoulder 66 and extends across the groove 68. The retaining members 70, 71 are secured in position by the spaced vertically disposed hold-fast devices 72, which extend through the slide 64.

The forward end terminal portion of the slide 64, is bifurcated, as at 73, and the furcation is arranged in advance of the groove 69. The rear wall of the furcation from its lower end is inclined upwardly and rearwardly, as indicated at 74.

Extending through and secured to the slide 64 and projecting into the grooves 67 and 68 is a vertical shaft 75, having its upper end provided with an anti-friction roller 76, and its lower end with an anti-friction roller 77. The retaining member 70 extends over roller 76, and the retaining member 71 extends over the roller 77. The roller 76 rides against the inner faces of the arms 55, and the roller 77 rides against the inner faces of the arms 56.

Extending through and secured to the reduced rear terminal portion 65 of the slide 64, is a vertical shaft 78, which has its ends opposing the shoulder 66, and mounted on the upper end of the shaft 78 is an anti-friction roller 79 and on the lower end of the shaft 78 is an anti-friction roller 80. The retaining member 70 projects over the roller 79 and the retaining member 71 projects across the roller 80. The roller 79 travels against the inner faces of the arms 55, and the roller 80 travels against the inner faces of the arms 56.

Extending transversely as well as secured to the slide 64, at a point between the groove 69 and the wall 74, and further positioned at the transverse center of the slide 64, is a shaft 81 of a length to project into the slots 57, and mounted on the projecting ends of said shaft 81 are flanged anti-friction guide rollers 82. Each of said rollers travels against the opposed faces of a pair of arms 55, 56, as well as against the inner and outer side faces of said arms. Extending transversely of the reduced portion 65 of the slide 64, as well as being secured thereto, and further projecting into the slots 57, is a shaft 83 having its ends provided with flanged anti-friction rollers 84. Each roller 84 travels against the opposed faces of a pair of arms 55, 56, and further against the inner and outer side faces of said arms.

Secured by the hold-fast devices 85 in a slot 37 of a guide member 52 or 53, in proximity to the portion 54 of such member, is a bearing block 86. Extending through the blocks 86, centrally thereof, is a crank shaft 87, which projects a substantial distance from each of the guide members 52, 53. Carried by the shaft 87, between the guide members 52, 53, is a pair of spaced crank arms 88, 89, having pivotally connected to the outer ends thereof, as at 90, the forward end of a pitman 91, which extends in the furcation at the forward end of the slide 64 and is pivotally connected to the latter, as at 92.

Fixedly secured to and depending from the outer ends of the shaft 87 is a pair of depending crank arms 93, 94. Extending between the lower ends of the crank arms 93, 94, as well as being pivotally connected to said lower ends, as at 95, are the side bars 96 of an inverted U-shaped yoke 97.

Pivoted to the yoke 97, centrally thereof, is the upper end 98 of a depending stem 99, which extends into the socket 47 and is adjustably connected to the stem 46 through the medium of the set screw 48.

Carried by the guide members 52 and 53, at the top thereof, is a pivoted latch 100. Each of the guide members 52, 53, at the top thereof is formed with a transverse groove 101. The transverse groove 101 of one side member registers with such groove in the other guide member, and the groove 69 in the slide 64 is adapted to register with the transverse grooves 101. When the groove 69 is in registration with the grooves 101, the latch 100 is shifted forwardly to seat in the registering grooves, whereby the slide 64 will be retained from shifting relatively to the guide members 52, 53, and the guide members will be held from shifting relative to the slide 64.

The manner in which the pressure control regulator operates will now be referred to. In order to speed the engine up, it is always necessary to lengthen the governor rod and if it is desired to slow the engine down it is necessary to shorten the governor rod. It will be assumed that the engine is driving a gas pump and that the latter is taking suction from a main gas line which extends for a length of say twenty miles, and that a plurality of gas wells are piped into the main gas line at different points, and that the engine must operate at a speed which will hold one pound pressure on the main gas line at any given point, by way of example, at the pump, and that the low pressure line 1 is connected at one end to the casing 4, and that the other end of the low pressure line is connected to the main suction near the pump and this will connect the suction pressure to the regulator. The slide 64 will be latched and the valve 2 closed. The set screw 48 will be loose, whereby the stem 99 will be in disconnected position with respect to the stem 46. The engine will be started with the parts in the position as stated. The speed of the engine is then controlled by shortening or lengthening the governor rod through the medium of the hand screw 102 located on the bar 62 or the governor rod as the case may be. Prior to the starting of the engine, the projection 51 is connected to the mixing valves of the engine if a gas engine is employed, or to the steam valve of the engine if a steam engine is employed. The speed of the engine is regulated until the engine is running at a speed that gives the one pound pressure on the main suction line at the pump and which gives one pound pressure against the valve 2 and at the stem 99. The valve 2 is then opened, which allows the one pound pressure to enter compartment 16 through the port 6, and this pressure acting against the diaphragm 10 raises the sleeve 23 around the stem 99 and carries the bar 41 upwardly against the action of the springs 33. The springs 33 are so adjusted that the one pound pressure will not shift the sleeve 23 to the limit of its upward movement, but will arrest the sleeve 23 at about half its travel. At this point the set screw 48 is tightened to secure the stem 99 to stem 46, and after such step the latch 100 is shifted to open position to release the slide. The regulator is now in operation and will run the engine at the proper speed to hold the one pound pressure on the suction line at the pump.

It will be assumed that one of the several gas well is shut in, and, therefore, it is not necessary for the engine to run at the set speed in order to hold the one pound suction pressure at the pump. If the pressure controlled regulator was not employed and coupled to the engine, the latter would speed up and pull the suction pressure below one pound, and as the load is lightened on the engine, as the suction pressure is lowered, the engine would keep speeding up until it pulled vacuum on the suction line if the engine was not slowed down, but with the pressure controlled regulator connected to the engine and in operation, if the engine would attempt to speed up faster than necessary to hold the one pound pressure on the suction line, the pressure would be lowered under the diaphragm 10 and the springs 33 acting on the bar 41 would force the sleeve 23 downward and which would shorten the governor rod and slow the engine down to the required speed.

It will be further assumed that the well referred to be turned back into the suction line and if the engine would run at the same speed, this extra amount of gas from the well turned into suction line, would cause the suction pressure to build higher than one pound, but as this extra pressure from the well, acting on the diaphragm 10, will raise the latter, it will carry the sleeve 23 therewith and shift the stem 99 upwardly, thereby lengthening the governor rod and which will speed up the engine just enough to hold up the one pound pressure on the suction line, due to the operating of the mixing valve or steam valve which are connected to the guide members 52 and 53.

In connection with the matter of safety, as to the running of the engine at the rated speed referred to, it will be assumed that the engine is built to run 125 R. P. M. If the stem 46 carried by the sleeve 23, which raises and lowers the stem 99, would be required to raise one inch in order to open the mixing valve enough to run the engine to its rated speed, it will be noted that after the sleeve 23 has raised one inch, valve 4 will be pressed against head piece or disk 5, thereby closing the port 6 and which will not allow any more pressure to enter the regulator, at the same time bar 41 will be raised against the stop screws 39, serving thereby as a second safety speed limit.

It is thought that the many advantages of a pressure controlled engine regulator, in accordance with this invention, can be readily understood, but although the preferred embodiment of the invention is as illustrated and described, yet changes in the details of construction can be had which will fall within the scope of the invention as claimed.

What I claim is:—

1. A pressure controlled engine regulator for pump engines comprising a regulating mechanism common to the governor rod and intake or mixing valve of the engine, and a suction pressure operated means for controlling the operation of said mechanism.

2. A pressure controlled engine regulator for pump engines comprising a regulating mechanism common to and provided with means for connection with the governor rod and intake or mixing valve of the engine, a pressure conducting means leading from a suction line, and a suction pressure control means communicating with said conducting means and operating said mechanism to regulate the speed of the engine.

3. A pressure controlled engine regulator for pump engines comprising a regulating mechanism common to and provided with means for connection with the governor rod and intake or mixing valve of the engine, a pressure conducting means leading from a suction line, and a suction pressure control means communicating with said conducting means and operating said mechanism to regulate the speed of the engine, the said suction pressure controlled means being further spring controlled.

4. A pressure controlled engine regulator for pump engines comprising a regulating mechanism common to and provided with means for connection with the governor rod and intake or mixing valve of the engine, a pressure conducting means leading from a suction line, and a suction pressure controlled means communicating with said conducting means and operating said mechanism to regulate the speed of the engine, said mechanism and suction pressure controlled means having coacting parts to provide for adjustably connecting the mechanism to the suction pressure controlled means.

5. A pressure controlled engine regulator for pump engines comprising a regulating mechanism common to and provided with means for connection with the governor rod and intake or mixing valve of the engine, a pressure conducting means leading from a suction line, and a suction pressure controlled means communicating with said conducting means and operating said mechanism to regulate the speed of the engine, the said suction pressure controlled means being further spring controlled, said mechanism and suction pressure controlled means having coacting parts to provide for adjustably connecting the mechanism to the suction pressure controlled means.

6. A pressure controlled engine regulator for pump engines comprising a pair of interengaging elements shiftable relatively to each other and one provided with means for connection with the governor rod of the engine and the other provided with means for connection with the intake or mixing valve of the engine, and a suction pressure controlled means connected to one of said elements to provide for the shifting of said element relatively to the other to regulate the speed of the engine.

7. A pressure controlled engine regulator for pump engines comprising a pair of interengaging elements shiftable relatively to each other and one provided with means for connection with the governor rod of the engine and the other provided with means for connection with the intake or mixing valve of the engine, and a suction pressure controlled means connected to one of said elements to provide for the shifting of said element relatively to the other to regulate the speed of the engine, the said means being further spring controlled.

8. A pressure controlled engine regulator for pump engines comprising a pair of interengaging elements shiftable relatively to each other and one provided with means for connection with the governor rod of the engine and the other provided with means for connection with the intake or mixing valve of the engine, and a suction pressure controlled means connected to one of said elements to provide for the shifting of said element relatively to the other to regulate the speed of the engine, said means and that element to which it is connected having coacting parts to provide for an adjustable connection therebetween.

9. A pressure controlled engine regulator for pump engines comprising a pair of interengaging elements shiftable relatively to each other and one provided with means for connection with the governor rod of the engine and the other provided with means for connection with the intake or mixing valve of the engine, and a suction pressure controlled means connected to one of said elements to provide for the shifting of said element relatively to the other to regulate the speed of the engine, the said means being further spring controlled, said means and that element to which it is connected having coacting parts to provide for an adjustable connection therebetween.

10. A pressure controlled engine regulator for pump engines comprising a spring controlled vertically movable actuating element, a suction pressure controlled diaphragm for shifting said element against the action of the spring control therefor, a pair of interengaging regulating elements shiftable relatively to each other and one provided with means for connection with the governor rod of the engine and the other provided with means for connection with the intake or mixing valve of the engine, and means for connecting one of said regulating elements to said actuating element to provide for the shifting of said regulating element when the actuating element is vertically moved.

11. A pressure controlled engine regulator for pump engines comprising a spring controlled vertically movable actuating element, a suction pressure controlled diaphragm for shifting said element against the action of the spring control therefor, a pair of interengaging regulating elements shiftable relatively to each other and one provided with means for connection with the governor rod of the engine and the other provided with means for connection with the intake or mixing valve of the engine, and means for adjustably connecting said actuating element to one of said regulating elements to provide for the shifting of the said regulating element when the actuating element is vertically moved.

12. A pressure controlled engine regulator for pump engines comprising a spring controlled vertically movable actuating element, a suction pressure controlled diaphragm for shifting said element against the action of the spring control therefor, a pair of interengaging regulating elements shiftable relatively to each other and one provided with means for connection with the governor rod of the engine and the other provided with means for connection with the intake or mixing valve of the engine, means for adjustably connecting said actuating element to one of said regulating elements to provide for the shifting of the said regulating element when the actuating element is vertically moved, and means for controlling the upward movement of said actuating element.

In testimony whereof, I affix my signature hereto.

ERNEST WILSON.